Oct. 22, 1968  W. J. G. COX  3,407,292
RESOLVER SYSTEM
Filed March 11, 1966  2 Sheets-Sheet 1
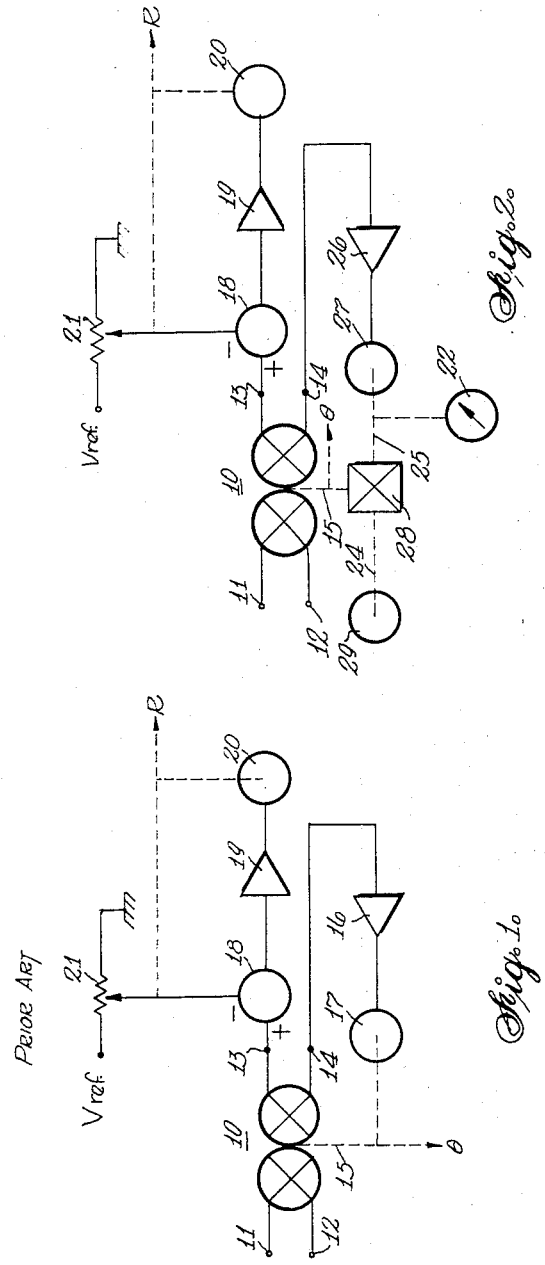
INVENTOR
William J. G. Cox
BY Weir, Marshall,
MacRae + Lamb.
PATENT AGENT

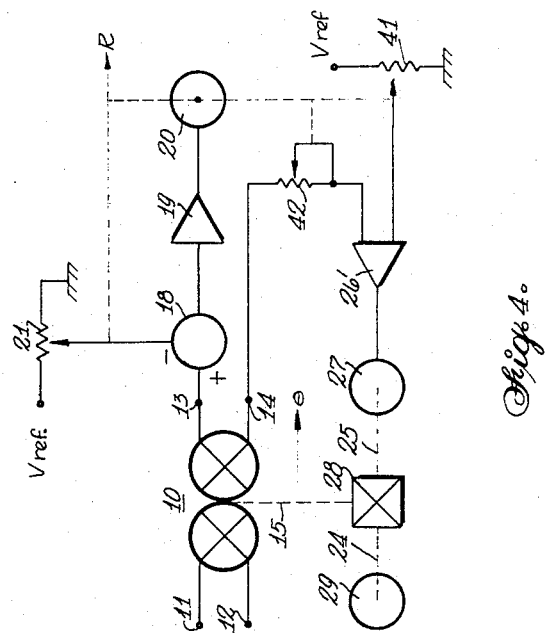
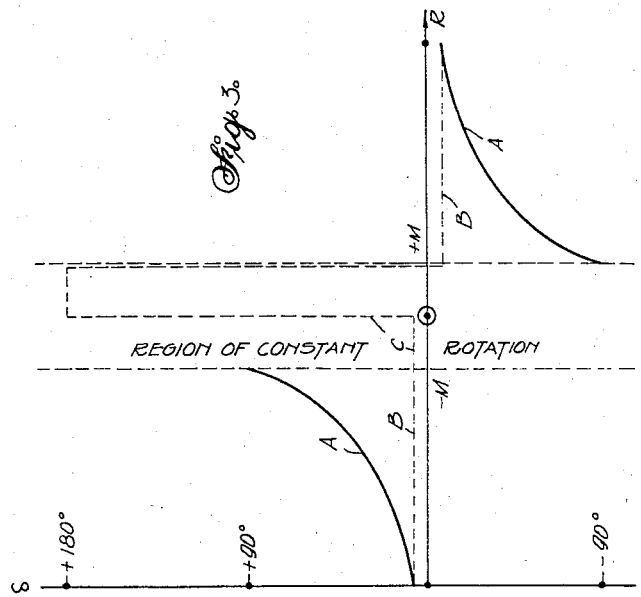

United States Patent Office 3,407,292
Patented Oct. 22, 1968

3,407,292
RESOLVER SYSTEM
William J. G. Cox, Ottawa, Ontario, Canada, assignor to Computing Devices of Canada Limited, Ottawa, Ontario, Canada
Filed Mar. 11, 1966, Ser. No. 533,714
7 Claims. (Cl. 235—186)

This invention relates to a resolver system useful in the solution of navigational problems and, in particular, to a resolver system having smaller errors than conventional systems when processing signals of small, near zero, value.

It is an object of this invention to provide a novel resolver system for converting cartesian coordinates to polar coordinates.

It is a further object of this invention to provide a novel resolver system for converting cartesian coordinates to polar coordinates which is not subject to substantial errors when the sign of the input data is abruptly changed.

Briefly, the resolver system of this invention includes a resolver having its rotor shaft connected to and driven by the output shaft of a mechanical differential. One input shaft of the mechanical differential is connected to a constant speed motor and the other input shaft is connected to a drive system controlled by the voltage appearing across one of the resolver rotor windings.

In the equilibrium state of operation of the resolver system the drive system rotates its corresponding differential input shaft at the same speed as that of the constant speed motor. The output shaft of the differential and the resolver rotor are stationary and represent the required angular polar coordinate corresponding to the cartesian coordinate signals supplied to the resolver stator windings.

The resolver system of this invention has the advantage that the offset, or error, in the resolver rotor shaft position is predictable as a function of the radial polar coordinate R. Accordingly, a modification of the resolver system of this invention utilizes a bias voltage derived from the R coordinate to reduce the offset in the rotor shaft position.

The features, advantages over the prior art and other objects of this invention will become apparent from the following description of two embodiments of this invention, taken in conjunction with the accompanying drawings in which:

FIGURE 1 is a schematic diagram of a resolver system known in the prior art,

FIGURE 2 is a schematic diagram of one embodiment of the resolver system of this invention, FIGURE 3 is a graphical plot of the offset angle of the resolver rotor shaft in the system of FIGURE 2, and FIGURE 4 is a schematic diagram showing a modified system related to the system of FIGURE 2.

Referring now to FIGURE 1 there is shown the schematic diagram of a known resolver system suitable for converting a pair of signals representing cartesian coordinates to a pair of signals representing polar coordinates. Reference numeral 10 is a diagrammatic representation of a conventional four-winding resolver having a pair of crossed windings in the stator and a pair of crossed windings in the rotor, each pair being arranged in space quadrature. The rotor is coupled to a shaft 15. For ease of description one end of each resolver winding will be considered to be connected to ground, or some similar point of reference potential although, it will be understood, this is in no way essential to the invention.

A pair of terminals 11 and 12 are provided for connection to a source of signals (not shown) representing X and Y cartesian coordinates respectively. Terminal 11 is connected to the non-grounded end of one of the stator windings and terminal 12 is similarly connected to the other stator winding. The non-grounded end of one of the rotor windings is connected to a terminal 13 and the other rotor winding is similarly connected to a terminal 14.

Terminal 14 is connected to a drive system formed by a amplifier 16 and an associated motor 17. Motor 17 is coupled to the shaft 15 of the resolver rotor.

The operation of that portion of the resolver system of FIGURE 1 so far described is well known. Signals representing the X and Y coordinates of a point are applied to terminals 11 and 12. The resulting signals appearing at terminals 13 and 14 are $(X \cos \theta + Y \sin \theta)$ and $(X \sin \theta - Y \cos \theta)$, respectively, where $\theta$ is the angle of rotation of the resolver rotor shaft. The system acts to reduce the signal at terminal 14 approximately to zero, that is to solve the equation:

$$\tan \theta = Y/X$$

Thus, the position of shaft 15 represents the required polar coordinate $\theta$. Under this condition the signal at terminal 13 $(X \cos \theta + Y \sin \theta)$ represents the required polar coordinate R. To obtain this coordinate in the form of a mechanical displacement terminal 13 is connected to a conventional position control system formed by an error detector 18, the output of which is connected to a second drive system formed by an amplifier 19 and an associated motor 20. A potentiometer 21 is provided connected between ground and a source of reference potential denoted by $V_{ref}$. The slider of the potentiometer is electrically connected to a second input of error detector 18 and positioned by a mechanical connection to the shaft of motor 20. This position control system acts to set the shaft of motor 20 to a position corresponding to the required polar coordinate R.

Considering again the drive system connected to shaft 15, this system will exhibit a dead zone, that is a region of small values of input signal around zero to which the drive system is not responsive. Due to this dead zone the output signals of the resolver system depart from the correct values. In particular, the signal representing $\theta$ is in error by an amount lying within a certain error zone. This error zone increases as the input signals decrease until a point is reached at which the drive system is not responsive. This increasing uncertainty as to the correct position of the $\theta$ shaft is a disadvantage of this prior art resolver system.

A further disadvantage arises from the fact that when the resolver system is in equilibrium the signal appearing at terminal 14 will be a small signal of amplitude less than the dead zone. If the coordinates represented by the signals applied to terminals 11 and 12 change abruptly from (X, Y) to (−X, −Y) the signal at terminal 14 changes in sign but not magnitude. Since the signal at terminal 14 previously lay within the dead zone it is likely that the new signal will also be smaller than the dead zone and the drive system will not be actuated. Thus the $\theta$ shaft will be in error by 180°.

A known modification for overcoming this latter disadvantage of the resolver system described above utilizes an additional resolver whose rotor is driven at a constant speed to modulate the cartesian coordinate signals before they are applied to the resolver system. Due to the alternating component in the modulated signal the system resolver rotates at the same rate as the modulating resolver and the output signal is derived by connecting the rotors of the resolvers to opposite input shafts of a mechanical differential. This effectively demodulates the output signal and the differential output shaft position conveys the desired information.

This known modified resolver system has the disadvantage of doubling the number of resolvers required. Since the resolvers are continuously rotating additional wear and brush noise is introduced. Since the output signal is derived from a mechanical differential it is subject to the mechanical errors inherent in the differential. It is not possible to have identical temperature compensation in both resolvers and accordingly the carrier phase will be temperature dependent.

One embodiment of the resolver system of this invention, which overcomes many of the disadvantages mentioned above, is shown in FIGURE 2. The resolver, its associated terminals and the position control system for setting the R coordinate shaft correspond to those components previously described in regard to the resolver system of FIGURE 1 and are denoted by the same reference numerals. The system for positioning the rotor shaft 15 of resolver 10 is, however, different from that shown in FIGURE 1. A mechanical differential 28 is provided having its output shaft coupled to rotor shaft 15. A constant speed motor 29 is provided connected to a suitable source of driving power (not shown). The shaft of motor 29 is coupled to an input shaft 24 of differential 28. A drive system formed by an amplifier 26 and a motor 27 is coupled to a second input shaft 25 of differential 28. The input to amplifier 26 is taken from terminal 14 which, as described above, is connected to one of the rotor windings of the resolver.

The operation of the coordinate conversion system of FIGURE 2 may best be described by noting that the system has an equilibrium position when the mechanical differential input shafts 24 and 25 rotate at the same speed. In this equilibrium position the resolver rotor is stationary at a position giving a sufficiently large output signal at terminal 14 to cause shaft 25 to rotate at the same speed as shaft 24. In other words, shaft 15 is not positioned so as to make the signal at terminal 14 zero but is positioned at an angle δ offset from this desired position. The signal appearing at terminal 14, expressed in terms of the radial coordinate and the offset angle of the resolver shaft, is $R \sin \delta$.

In order that the resolver system should remain in equilibrium the steady state signal at terminal 14 must remain constant. Thus as the radial coordinate decreases the offset angle δ of the rotor shaft must increase. This situation is shown in FIGURE 3 in which the solid line A is a graph of the typical variation in rotor shaft offset δ plotted against the radial coordinate R. When the radial coordinate becomes less than the dead zone of the drive system (here assumed to extend from −M to +M) the drive system no longer responds to its input signal and shaft 25 ceases to rotate. When this condition occurs shaft 15 rotates at a constant speed driven, through the differential gearing, by motor 29. Thus in the graph of FIGURE 3 the region for which R is less than M is designated a "Region of Constant Rotation" and, in this region, the output signals from the coordinate conversion system are not meaningful.

An indication as to when the output signals from the coordinate conversion system are to be disregarded may be provided by a pointer 22 shown coupled to shaft 25 in FIGURE 2. In normal operation of the system the pointer will be continuously rotating; when motor 27 ceases to rotate, due to the input signal to amplifier 26 falling within the dead zone, the pointer will become stationary.

Thus, it will be noted, the resolver system of FIGURE 2 has the feature that the signal applied to the drive system from terminal 14 is normally greater than the dead zone of the drive system and the resolver is able to respond to any abrupt change in the sign of the input data.

A further significant feature of the resolver system of FIGURE 2 is that the offset angle δ of the resolver rotor shaft is single valued and a function of R, the radial coordinate, as shown by curve A in FIGURE 3. Because of this feature it is possible to reduce the rotor shaft offset by means of a biasing network controlled according to the value of the R coordinate. Correction of rotor offset by means of a biasing network is not possible in the prior art system of FIGURE 1 because the rotor shaft error is an indeterminate quantity lying within an error zone specified by the input signal and the dead zone of the drive system.

An embodiment of the invention utilizing such a biasing network is shown in FIGURE 4. Components corresponding to those already described in connection with FIGURES 1 and 2 bear the same reference numerals. Referring now to FIGURE 4, a summing amplifier 26′ is provided in the drive system for input shaft 25 of the mechanical differential 28. One input of summing amplifier 26′ is connected to terminal 14 via a variable resistor 42. The other input of summing amplifier 26′ is connected to the slider of a potentiometer 41 connected between a source of reference potential and ground. The control of the variable resistor and the slider of the potentiometer are both mechanically coupled to the shaft of motor 20 and are thus positioned according to the value of the R coordinate.

In the operation of the resolver system of FIGURE 4 negligible bias is applied from potentiometer 41 to amplifier 26′ for large and medium values of the R coordinate and increasing amounts of bias are supplied as the R coordinate decreases. The biasing of the resolver system is sufficient to reduce the offset error of the resolver rotor shaft to that represented by curve B in FIGURE 3. There will still be a range of signals within which the combined effect of the biasing signal and the signal from terminal 14 is less than the dead zone of the drive system, but outside this range the offset error has been considerably reduced.

Thus, it will be noted, the resolver system of FIGURE 4 has the feature that the offset error has been greatly reduced for all coordinate signals other than those having a value of R, the radial coordinate, less than the dead zone of the system.

It is possible to arrange the biasing network so that, when the signal at terminal 14 becomes too small to give effective control, the biasing voltage increases sufficiently to effect the rotation of motor 27 at the same speed as motor 29. This results in shaft 15 remaining stationary even though the system is operating within the dead zone. Thus no region of constant rotation exists, such as was described in connection with the embodiment of FIGURE 2. With such biasing, the error in rotor shaft position is shown as curve C in FIGURE 3. It will be understood that system operation in the region represented by curve C conveys no meaningful information but merely represents the extrapolation of the last coordinate outside the dead zone along a constant angle θ. The change in δ by 180° represents the fact that, as the coordinate signals pass through zero without a change in rotor shaft position, the error, which was assumed to be 0° must become 180°.

Referring again to FIGURE 4 the function of variable resistor 42 is to provide a variable gain control for the overall position control system for shaft 25. While the setting of the variable resistor 42 will affect the offset of rotor shaft 15 its main purpose is to alter the dynamic response of the position control system for shaft 25. Accordingly, it is intended that the variable gain control provided by variable resistor 42 should be effective at relatively large values of R and the variable bias provided by potentiometer 41 should be effective at relatively small values of R. The resolver system of this invention may be operated without either the variable gain control or the variable bias potentiometer or with only one of these.

Thus, there has been described a novel resolver system suitable for converting cartesian coordinates to polar coordinates and not subject to substantial errors when the sign of the input data changes abruptly. It will be noted that the disclosed inventive system requires only one resolver which may be of the compensated type to give zero phase error. The resolver is not continually rotating, thereby eliminating one source of wear and noise in previously known systems. Since the output signal $\theta$ is obtained from the resolver rotor in the disclosed system, errors in the mechanical differential do not affect the output signal. It will be clear to one skilled in the art that many of the components in the disclosed embodiments of this invention may be replaced by well known equivalents. For example, the mechanical differential could be replaced by any suitable differential apparatus having first and second input shafts and an output shaft arranged so that the displacement of the output shaft is a function of the difference of the displacements of the input shafts. The scope of this invention is not to be limited solely by the two disclosed embodiments but is defined by the following claims.

I claim:
1. A resolver system comprising,
   a resolver having a pair of input windings arranged in space quadrature and an output winding variably positionable with respect to said input windings,
   differential apparatus having a first and a second input shaft and an output shaft, said output shaft positioning said output winding of said resolver,
   a first drive system rotating said first input shaft at a constant speed, and
   a second drive system connected between said output winding and said second input shaft responsive to electrical signals on said output winding to rotate said second input shaft at a speed proportional to said electrical signals.
2. A coordinate conversion system comprising,
   a resolver having a pair of input windings and an output winding variably positioned with respect to said input windings, said input windings being in space quadrature with one another and adapted to receive signals representative of cartesian positional coordinates,
   differential apparatus having a first and a second input shaft and an output shaft, said output shaft positioning the output winding of the resolver,
   a first drive system rotating said first input shaft at a constant first speed,
   a second drive system connected between said output winding and said second input shaft responsive to electrical signals across said output winding to rotate said second input shaft at a second speed proportional to said electrical signals,
   said system having a normal mode of operation making said first speed equal to said second speed to constrain said output shaft position to represent the angular polar coordinate corresponding to said cartesian coordinates.
3. A coordinate conversion system comprising,
   a resolver having a first pair of windings in quadrature with each other, a second pair of windings in quadrature with each other and shaft means for altering the relative positions of said first and second pairs of windings,
   differential apparatus having a first and a second input shaft and an output shaft said output being coupled to said resolver shaft means,
   a first drive system connected between a first one of said second pair of windings and said first input shaft responsive to electrical signals on said last-mentioned winding to rotate said first input shaft at a speed proportional to said electrical signals,
   a second drive system connected to said second input shaft for constant speed rotation,
   a data shaft, and
   a position control system connected between the other of said second pair of windings and said data shaft responsive to the signal on said last-mentioned windings to position said data shaft.
4. A coordinate conversion system as defined in claim 3 wherein said first drive system has a variable gain control responsive to the position of said data shaft.
5. A coordinate conversion system as defined in claim 3 wherein said first drive system includes a variable bias source responsive to the position of said data shaft.
6. A coordinate conversion system as defined in claim 5 wherein said data shaft has a reference position and the output of said variable bias source increases as said data shaft approaches the reference position.
7. A coordinate conversion system as defined in claim 6 wherein the output of said bias source alone causes said first and second input shaft to rotate at the same speed when said data shaft is in said reference position.

References Cited

UNITED STATES PATENTS

| 2,728,882 | 12/1965 | Cohen | 235—186 |
| 2,949,233 | 8/1960 | Fogarty | 235—186 |
| 2,989,239 | 6/1961 | Bailey | 235—186 |

FOREIGN PATENTS

| 668,660 | 3/1952 | Great Britain. |
| 971,121 | 9/1964 | Great Britain. |

MALCOLM A. MORRISON, *Primary Examiner.*

R. W. WEIG, *Assistant Examiner.*